United States Patent [19]

Kitamura

[11] 4,061,265
[45] Dec. 6, 1977

[54] PRESSURE AND TEMPERATURE RESPONSIVE VALVE ASSEMBLY

[75] Inventor: Kazuhiko Kitamura, Toyota, Japan

[73] Assignee: Aisin Seiki Kabushiki Kaisha, Kariya, Japan

[21] Appl. No.: 697,645

[22] Filed: June 18, 1976

[30] Foreign Application Priority Data

June 18, 1975 Japan .................................. 50-74705

[51] Int. Cl.² ........................................... G05D 23/10
[52] U.S. Cl. ............................... 236/48 R; 236/92 D; 123/119 A
[58] Field of Search ................. 123/119 A; 236/48 R, 236/92 R, 92 D, 101 C

[56] References Cited

U.S. PATENT DOCUMENTS

| 2,837,285 | 6/1958 | Urban .............................. 236/92 R X |
| 3,587,963 | 6/1971 | Meulendyk et al. .............. 236/92 R |
| 3,700,166 | 10/1972 | Foults ............................. 236/92 R X |
| 3,994,269 | 11/1976 | Takaoka et al. ................ 236/92 R X |
| 4,016,853 | 4/1977 | Bible .............................. 123/119 A X |

Primary Examiner—William E. Wayner
Assistant Examiner—William E. Tapolcai, Jr.
Attorney, Agent, or Firm—Sughrue, Rothwell, Mion, Zinn and Macpeak

[57] ABSTRACT

A pressure and temperature responsive valve assembly comprises a single valve housing within which are disposed a first valve operable in response to the pressure difference and a second valve operable in response to the changes in temperature surrounding the housing; said two valves being operable independently of each other.

5 Claims, 1 Drawing Figure

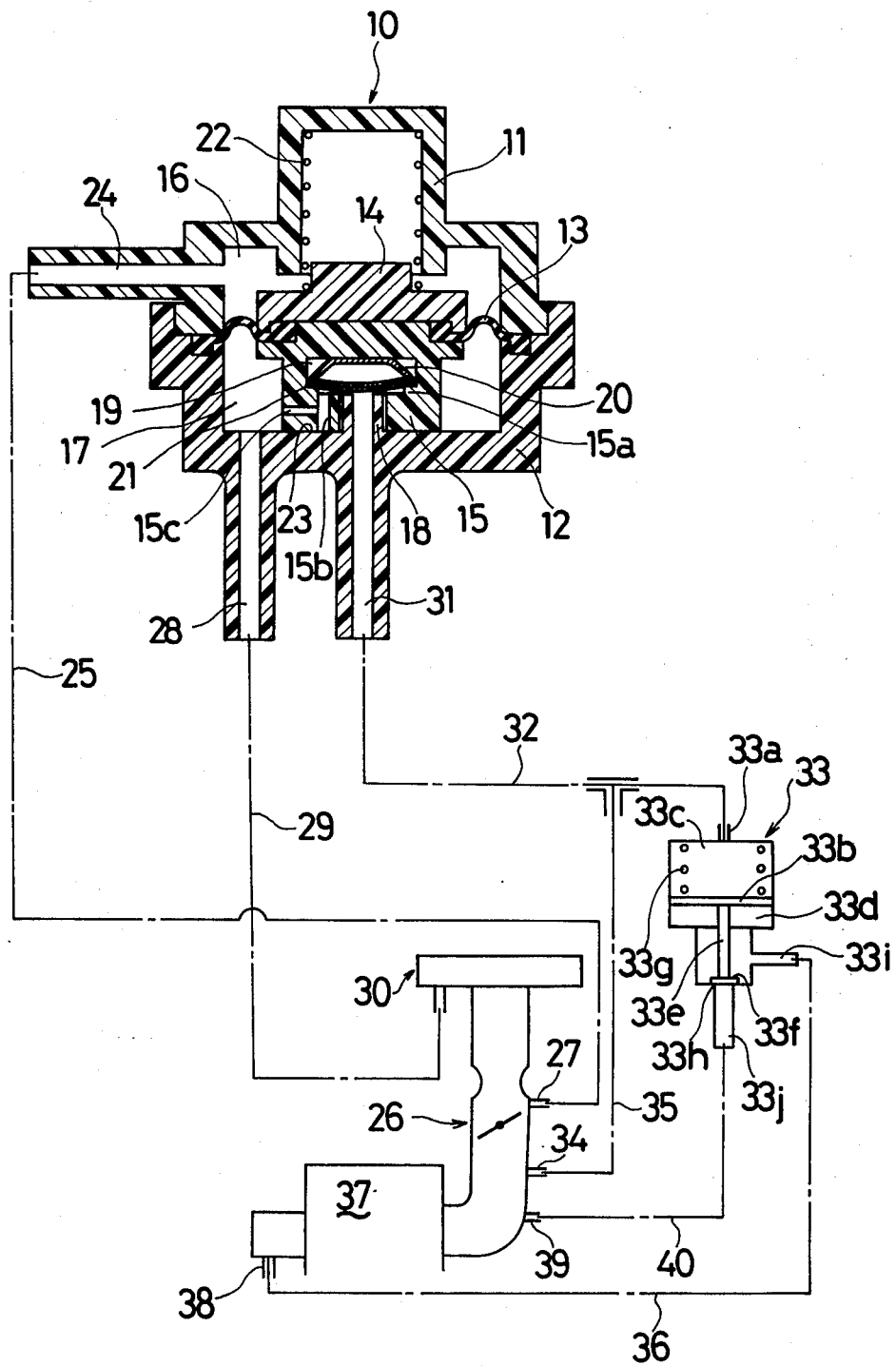

PRESSURE AND TEMPERATURE RESPONSIVE VALVE ASSEMBLY

BACKGROUND OF THE INVENTION

1. Field of the Invention

This invention relates to a change over valve which is operable in response to the temperature as well as to the pressure.

2. Prior Art

Conventionally, two separate valve assemblies have been necessary in order to provide two different operational functions, one assembly being for operation in response to temperature and the other being for operation in response to a pressure difference. Such a temperature responsive valve is disclosed in U.S. application of Kitamura et al, Ser. No. 620,680 which was filed on Aug. 10, 1975. Such a pressure differential valve is disclosed in U.S. Pat. No. 3,585,328 to Fiore et al.

SUMMARY OF THE INVENTION

The present invention provides a change over valve which accomplishes the two above-mentioned operations in a single valve assembly in order to reduce the number of elements.

According to the present invention, there is provided a single valve housing within which are disposed a pressure responsive valve and a temperature responsive valve. Both valves are operable independently of each other.

The foregoing and other objects, features and advantages of the present invention will be apparent from the following more particular description of a preferred embodiment of the invention as illustrated in the accompanying drawing.

BRIEF DESCRIPTION OF THE DRAWING

The single FIGURE is a sectional view of a preferred embodiment of the valve according to the present invention as applied to the schematic of an exhaust gas recirculation system of an automobile vehicle.

DETAILED DESCRIPTION OF THE PREFERRED EMBODIMENTS

Pressure-temperature responsive valve assembly 10 is shown to incorporate two casing members 11, 12 formed of synthetic resin. The outer periphery of a ring shaped diaphragm 13 formed of elastic material, such as rubber, is secured between members 11, 12 by way of ultrasonic bonding or the like, while the inner periphery of the diaphragm 13 is secured to a pressure plate 14 and a power piston 15 and sealingly supported therebetween by way of ultrasonic bonding. Thus, the two casing members 11, 12 define two compartments 16, 17 which are hermetically sealed from one another by the diaphragm 13 and by the plate 14 and piston 15.

The two members 14, 15 are reciprocable together with the diaphragm 13 within the compartments 16, 17 in response to a pressure differential between compartments 16 and 17. The free end surface of the power piston 15 is engageable with the inner wall 23 of the casing member 12. An inwardly extending projection 18 is provided on the wall 23 and a hollow chamber 19 is provided in the power piston 15 for receiving the projection 18 when the power piston 15 is moved downward to the position shown in the drawing.

Within the hollow chamber 19 of the power piston 15 there is disposed a snap action type bimetal 21 which snaps over center when the temperature surrounding the valve 10 reaches a predetermined value so that in its snapped condition the convex side of the bimetal 21 will be in contact with the end of the projection 18 as shown. When the temperature surrounding the valve 10 is below the predetermined value the concave surface of the bimetal 21 is spaced from the end of the projection 18 to open the port 31 which communicates with the hollow chamber 19. The bimetal 21 is supported on an annular shoulder 15a provided in the hollow chamber 19 and is also supported by a leaf spring 20 disposed within the hollow chamber 19. The movement of the power piston 15 is guided by the outer periphery of the projection 18.

The pressure plate 14 is biased by a return spring 22 disposed between the inner wall of the casing member 11 and the pressure plate 14. Each compartment 16, 17 has a port 24, 28, respectively. The compartment 17 communicates with the hollow chamber 19 of the power piston 15 through bores 15c, 15b provided in the power piston 15. When the bimetal is in the illustrated position, the communication between the port 28 and port 31 is interrupted since the power piston 15 is engaged with the inner wall 23 of the member 12.

The port 24 communicates with an advance port 27 of the carburetor 26 of the vehicle through pipe 25. The port 28 communicates with an air cleaner 30 through pipe 29 and the port 31 communicates with a port 33a of an E.G.R. valve assembly 33 through pipe 32. A branch of the pipe 32 is connected to a port 34 of the carburetor 26 through pipe 35. The port 34 is generally called the intake manifold port.

The E.G.R. valve assembly 33 includes a power piston 33b therein to define two chambers 33c and 33d. Chamber 33c communicates with the port 33a, the other chamber 33d always communicates with an atmospheric pressure through a port (not shown).

The power piston 33b is connected with a vlave 33f through a rod 33e. When no pressure difference exists between two chambers 33c, 33d, the power piston 33b is biased downward by spring 33g to seat the valve 33f on a valve seat 33h thereby interrupting communication between the chamber 33d and a port 33j. The port 33j communicates with another intake manifold port 39 through pipe 40. The chamber 33d further has a port 33i which communicates with an exhaust manifold 38 of the engine 37 of a vehicle through pipe 36.

Operation

When the valve 10 is incorporated into an E.G.R. system and the engine is idling or the vehicle, is running at low or constant speed, the negative pressure will be below the predetermined value, i.e., the pressure from the advance port 27 is high. In this case, since no pressure difference between two chambers 16, 17 is generated, the pressure plate 14 and the power piston 15 are moved downward by the spring 22. Thus, the free end of the power piston 15 is in contact with the inner wall 23 of the casing member 12.

Under such conditions when the engine is not warm and the temperature surrounding the valve assembly 10 (i.e., the temperature of the engine compartment of the vehicle) is below the predetermined value, the concave side of the bimetal valve 21 is spaced from the end of the projection 18 so that even if the power piston 15 is in contact with the inner wall 23 of the member 12 the air from the air cleaner 30 through pipe 29, port 28, compartment 17, bores 15c, 15b is transmitted to the chamber 33c of the E.G.R. valve 33 via port 31, pipe 32, port 33a. Therefore, the power piston 33b is moved downward by the spring 33g to seat the valve 33f on the valve seat 33h. Due to the interruption of the ports 33j and 33i, the exhaust gases from the exhaust manifold 38 do not flow into the combustion chamber of the engine 37.

When the vehicle is running at constant speed and the temperature surrounding the valve assembly 10 reaches a predetermined value, the bimetal valve 21 then snaps over center so that the convex side of the bimetal will be in contact with the end of the projection 18 to interrupt the communication between the ports 28 and 31. Accordingly, instead of the air being transmitted to chamber 33c a vacuum will be applied to the chamber 33c through the port 34 and pipe 35. Due to the pressure difference between the chambers 33c and 33d the power piston 33b is moved upward to separate the valve 33f from the seat 33h. Thus, the exhaust gases from the exhaust manifold 38 are then transmitted to the combustion chamber of the engine 37 via chamber 33d, port 33j, pipe 40 and port 39 to complete the exhaust gas recirculation.

When the vehicle is accelerated or running at high speed the throttle valve is fully opened to accelerate the vehicle and the negative pressure is transmitted from the port 27 to the compartment 16 through port 24. Due to the pressure difference between the two compartments 16, 17, the pressure plate 14 and the power piston 15 are moved upward overcoming the biasing force of the spring 22. Thus, the end of the power piston 15 is spaced from the inner wall 23 of the member 12. Due to the movement of the power piston 15 the bimetal valve 21 also moves upward to separate the bimetal valve 21 from the end of the projection 18. Therefore, in this case whether the bimetal valve 21 is snapped over or not, the air from the air cleaner 30 is transmitted to the port 31 via pipe 29, port 28, compartment 17 and the hollow chamber 19.

Therefore, the air is further transmitted to the chamber 33c of the E.G.R. valve 33 via pipe 32 and port 33a thereby to move the power piston 33b downward by the spring 33g to seat the valve 33f on the valve seat 33h. Thus, the communication between the ports 33i and 33j will be interrupted to prevent the exhaust gas from the exhaust manifold 38 from flowing into the intake manifold.

It should be noted that this valve assembly 10 of the present invention is also applicable to other systems such as an Air Injection System wherein the pipe 32 is connected to an Air Injection valve instead of the E.G.R. valve 33 of the drawing.

According to the present invention, only one valve assembly is provided in order to control the fluid communication passages in response to the changes of the temperature in case of no pressure difference being established and to control the fluid communication passages in response to a pressure difference being established independently of the changes of temperature.

While the invention has been particularly shown and described with reference to a preferred embodiment thereof it will be understood by those in the art that various changes in form and details may be made therein without departing from the spirit and scope of the invention.

What is claimed is:

1. A pressure and temperature responsive valve assembly comprising:
   a housing;
   piston means movably disposed within said housing and dividing the housing into first and second compartments, first port means adapted to connect said first compartment with a first pressure source and second port means adapted to connect said second compartment with a second pressure source;
   said piston means being movable between first and second positions due to the pressure difference established between said two compartments;
   third port means adapted to connect said second compartment with a fluid actuated device, fluid communication between said second compartment and said fluid actuated device being controlled by the movement of said piston means; and
   bimetallic snap valve means carried by said piston means and operable for controlling the communication between said second compartment and said fluid actuated device in response to changes in the temperature surrounding said housing.

2. The valve assembly according to claim 1 wherein said piston means and said bimetallic snap means are so related that said controlling operations of said piston means and said bimetallic snap valve means are performed independently of each other.

3. The valve assembly according to claim 2 further comprising biasing means normally biasing said piston means to said first position to interrupt the communication between the second compartment and the fluid actuated device, said piston means being moved to said second position when the pressure difference between the two compartments reaches a predetermined value to thereby establish the communication between the second compartment and the fluid actuated device.

4. The valve assembly according to claim 3, wherein said power piston means is provided with a hollow chamber within which is disposed said bimetallic snap valve means, passage means in said piston means communicating with said third port through said chamber with the communication therebetween being controlled by the actuation of said bimetallic snap valve means.

5. The valve assembly according to claim 4 wherein said third port means is comprised of a projection on said housing having a passage therethrough extending into said second compartment so that when said piston means is biased into said first position said projection will extend into said chamber for cooperation of said bimetallic snap valve means with said passage through said projection.

* * * * *